(12) United States Patent
Kurosawa et al.

(10) Patent No.: US 6,796,185 B2
(45) Date of Patent: Sep. 28, 2004

(54) DIFFERENTIAL PRESSURE/PRESSURE TRANSMITTER

(75) Inventors: Ryou Kurosawa, Musashino (JP); Mamoru Aizawa, Musashino (JP)

(73) Assignee: Yokogawa Electric Corporation, Tokyo (JP)

( * ) Notice: Subject to any disclaimer, the term of this patent is extended or adjusted under 35 U.S.C. 154(b) by 0 days.

(21) Appl. No.: 10/400,417

(22) Filed: Mar. 28, 2003

(65) Prior Publication Data

US 2004/0040384 A1 Mar. 4, 2004

(30) Foreign Application Priority Data

Aug. 30, 2002 (JP) ........................................ 2002-252425

(51) Int. Cl.$^7$ .............................................. G01L 15/00
(52) U.S. Cl. .............................. 73/716; 73/714; 73/715
(58) Field of Search ................................... 73/700–756

(56) References Cited

U.S. PATENT DOCUMENTS 4,105,061 A * 8/1978 Tunnicliffe .................. 422/243
4,670,733 A * 6/1987 Bell ............................ 338/36
5,319,981 A * 6/1994 Mei et al. ..................... 73/706

FOREIGN PATENT DOCUMENTS

| JP | 5-142077 | 6/1993 |
| JP | 5-172676 | 7/1993 |
| JP | 5-187948 | 7/1993 |
| JP | 8-189871 | 7/1996 |

* cited by examiner

*Primary Examiner*—Edward Lefkowitz
*Assistant Examiner*—Jermaine Jenkins
(74) *Attorney, Agent, or Firm*—Westerman, Hattori, Daniels & Adrian, LLP

(57) ABSTRACT

The differential pressure/pressure transmitter of the present invention detects overpressures by using pre-loading diaphragms. The differential pressure/pressure transmitter of the present invention is provided with a high pressure-side diaphragm assembly 24 having a high pressure-side process diaphragm 34, which transfers high pressure from a process to the high pressure-side transfer oil, and a high pressure-side pre-loading diaphragm 32. The differential pressure/pressure transmitter is also provided with a low pressure-side diaphragm assembly 25 having a low pressure-side process diaphragm 38 and a low pressure-side pre-loading diaphragm 36. A differential pressure sensor assembly is provided to detect the pressure difference between the high pressure-side transfer oil from the high pressure-side diaphragm assembly and the above low pressure-side transfer oil from the low pressure-side diaphragm assembly.

10 Claims, 7 Drawing Sheets

# DIFFERENTIAL PRESSURE/PRESSURE TRANSMITTER

BACKGROUND OF THE INVENTION

1. Field of the Invention

The present invention relates to differential pressure/pressure transmitters, and in particular to pressure transmitters used for industrial measurement, having a construction in which an overpressure, even if applied to the pressure sensing assembly, is not transferred to the sensor itself, thus preventing sensor damage.

2. Description of the Prior Art

In the past, as a characteristic index of diaphragms adopted for differential pressure/pressure transmitters, "f(φ)" has been conventionally used to indicate the characteristic of diaphragm displacement volume "ΔV" to pressure "P". For this characteristic, it is desirable that the linear relationship have as uniform a slope as possible in a measuring pressure range.

A differential pressure transmitter adopting a center diaphragm having such an ideal characteristic becomes capable of obtaining output signals from the sensor proportional to the process pressures. The transmitter also enables measurement error to be extremely small, even if higher order terms in a higher order equation are neglected in signal conversion in the amplifier assembly and in corrective calculation in the CPU.

In the meantime, conventional differential pressure/pressure transmitters adopting a conventional three-diaphragm system, that is, comprising two process diaphragms on the high and low pressure sides and one center diaphragm inside the body, for a total of three diaphragms, have a construction in which the center diaphragm moves in both directions depending on the process pressures.

In such a construction, it is required to obtain the uniform linear characteristic "f(φ)". To obtain such a characteristic, it is effective to take a remedial measure such as increasing the outer diameter of the center diaphragm or making the thickness of the center diaphragm thinner.

However, the problem is mainly solved by increasing the diameter of the center diaphragm because making the thickness of the diaphragm thinner may cause greater stress to be generated.

In these differential pressure/pressure transmitters using such a three-diaphragm system, if an overpressure is applied to a process diaphragm on the high pressure side or the low pressure side, the process diaphragm on the pressure-applied side is closely pressed to the body.

This stops moving of the pressure transferring oil enclosed inside the body, then pressure transfer to the sensor assembly is lost, and the overpressure is not transferred to the sensor assembly.

As shown in FIG. 1 and FIG. 2, differential pressure/pressure transmitter 110 is composed of pressure detection assembly 111 that converts the pressure based on the pressure difference between high pressure and low pressure from a process and amplifier assembly 112 that comprises the electrical circuit to amplify signals generated in detection assembly 111.

Pressure detection assembly 111 is composed of a high pressure-side flange 113 forming the high pressure introducing part that introduces high pressures from a process, a low pressure-side flange 114 forming the low pressure introducing part that introduces low pressures from a process, and pressure sensing assembly 115 that detects both high pressure from high pressure-side flange 113 and low pressure from low pressure-side flange 114 using a diaphragm. High pressure-side flange 113 and low pressure-side flange 114 are fixed with nuts 116 and bolts 117.

Pressure sensing assembly 115, as shown in FIG. 2, has body 121 whose upper middle part is formed in the shape of a slender neck, sensor assembly 123 fixed in the center position of the upper part of body 121 using ring 122, high pressure-side diaphragm assembly 124 and low pressure-side diaphragm assembly 125 provided facing to the outside and positioned back to back to each other in the lower part of body 121.

Further, inside body 121, high pressure-side oil transfer hole 126 which transfers oil from high pressure-side process diaphragm assembly 124 to sensor assembly 123 and low pressure-side oil transfer hole 127 which transfers oil from low pressure-side process diaphragm assembly 125 to sensor assembly 123 are provided. Details of each part will be described below.

Sensor assembly 123 is composed of terminal 128, differential pressure sensor 129 that detects differential pressures by applying high pressure-side pressure from the top, and low pressure-side pressure from the bottom of the differential pressure sensor, and two hermetically sealed terminals 130a and 130b which are electrically connected to differential pressure sensor 129 by wire-bonding. The two hermetically sealed terminals 130a and 130b are connected to amplifier assembly 112 shown in FIG. 1.

There is a space between high pressure-side diaphragm assembly 124 and body 121, in which high pressure-side oil 133 is enclosed, and this space is connected with high pressure-side conducting hole 139 which leads to the space between center diaphragm C and body 121.

In addition, high pressure-side conducting hole 139 is connected to high pressure-side oil transfer hole 126. These spaces and holes are filled with high pressure-side oil 133 for pressure transfer.

Similarly, there is a space between low pressure-side diaphragm assembly 125 and body 121, in which low pressure-side oil 137 is enclosed, and this space is connected with low pressure-side conducting hole 142 which leads to the space between center diaphragm C and body 121.

Low pressure-side conducting hole 142 is also connected to low pressure-side oil transfer hole 127. These spaces and holes are filled with low pressure-side oil 137.

In differential pressure/pressure transmitter 110 having the above described structure, specifically in pressure sensing assembly 115, if high pressure-side diaphragm assembly 124, for example, receives pressure from a high pressure-side process, that pressure is transferred to high pressure-side oil 133 and the transferred pressure of high pressure-side oil 133 is supplied to differential pressure sensor 129 in sensor assembly 123 and center diaphragm C via high pressure-side transfer hole 126 after passing through high pressure-side conducting hole 139.

At the same time, if low pressure-side diaphragm assembly 125 receives pressure from the low pressure-side process, that pressure is transferred to low pressure-side oil 137 and the transferred pressure of low pressure-side oil 137 is supplied to differential pressure sensor 129 in sensor assembly 123 and center diaphragm C via low pressure-side transfer hole 127 after passing through low pressure-side conducting hole 142.

In such a manner, pressures from the high pressure-side and low pressure-side are transferred using oil 133 and 137, and their difference is detected with differential pressure sensor 129.

In this case, if a pressure difference is generated between the high pressure side and low pressure side and, for example, the pressure on the high pressure side becomes an overpressure as a result of loss of pressure balance between the high and low pressure sides, the process diaphragm of high pressure-side diaphragm assembly 124 moves towards body 121, and the center diaphragm C is also deflected corresponding to the volume of moved oil at that time.

Further, the low pressure-side oil also moves due to the deflection of center diaphragm C to push the process diaphragm of low pressure-side diaphragm assembly 125 towards the outside.

However, if a center diaphragm in the three-diaphragm system described in conventional techniques is employed, the stress generated in the center diaphragm becomes high and so there is a problem that a stronger material from the viewpoint of strength of material must be employed.

In addition, although it is required that the material itself has ductility for forming diaphragms, if a stress generated in the center diaphragm employed for differential pressure/pressure transmitters becomes high, a strong, non-ductile material is an indispensable requirement for the center diaphragm itself.

From the above description, center diaphragms supplied by conventional techniques cannot solve these conflicting problems because such strong diaphragms in material strength are hard and not ductile and thus difficult to be molded as center diaphragms.

Consequently, there is a problem to be solved so that the corrugated shape of the center diaphragm is improved, with which a large displacement volume is ensured even if the stress is small, that is, a larger volume is obtained by comparing moving volumes in the initial state of the center diaphragm and in the state of the pressure application to the center diaphragm.

SUMMARY OF THE INVENTION

The differential pressure/pressure transmitter concerning the present invention, in which the solutions to the above problems are achieved, is as shown below.

(1) A differential pressure/pressure transmitter provided with a high pressure-side diaphragm assembly comprising a high pressure-side process diaphragm, which transfers a high pressure from a process to the high pressure-side transfer oil, and a high pressure-side pre-loading diaphragm arranged so that its surface contacts the above high pressure-side transfer oil in addition to its back surface contacting closely the high pressure wetted surface having the low pressure-side overpressure liquid path;

a low pressure-side diaphragm assembly comprising a low pressure-side process diaphragm, which transfers a low pressure from the process to the low pressure-side transfer oil, and a low pressure-side pre-loading diaphragm arranged so that its surface contacts the above low pressure-side transfer oil in addition to its back surface contacting closely the low pressure wetted surface having the high pressure-side overpressure liquid path; and a differential pressure sensor assembly which detects the pressure difference between the above high pressure-side transfer oil from the above high pressure-side diaphragm assembly and the above low pressure-side transfer oil from the above low pressure-side diaphragm assembly;

the above high pressure-side pre-loading diaphragm and low pressure-side pre-loading diaphragm further respectively comprising:

a center flat part obtained by forming the center position in a flat, disk shape, a corrugated part obtained by forming the outside of the above center flat part in a corrugated shape so that the outside part of the above center flat part projects towards a plane contacting the above high pressure-side or low pressure-side wetted surface, and an outer flat part obtained by flattening the section from the outside of the above corrugated part to the periphery.

(2) A differential pressure/pressure transmitter mentioned in (1), wherein the number of corrugations composing the above corrugated part is only one.

(3) A differential pressure/pressure transmitter mentioned in (1), wherein the number of corrugations forming the above corrugated part is two or more.

(4) A differential pressure/pressure transmitter provided with a high pressure-side diaphragm assembly comprising a high pressure-side process diaphragm, which transfers a high pressure from a process to the high pressure-side transfer oil, and a high pressure-side pre-loading diaphragm arranged so that its surface contacts the above high pressure-side transfer oil in addition to its back surface contacting closely the high pressure wetted surface having the low pressure-side overpressure liquid path;

a low pressure-side diaphragm assembly comprising a low pressure-side process diaphragm, which transfers a low pressure from the process to the low pressure-side transfer oil, and a low pressure-side pre-loading diaphragm arranged so that its surface contacts the above low pressure-side transfer oil in addition to its back surface contacting closely the low pressure wetted surface having the high pressure-side overpressure liquid path; and a differential pressure sensor assembly which detects the pressure difference between the above high pressure-side transfer oil from the above high pressure-side diaphragm assembly and the above low pressure-side transfer oil from the above low pressure-side diaphragm assembly;

the above high pressure-side pre-loading diaphragm and low pressure-side pre-loading diaphragm further respectively comprising:

a center flat part obtained by forming the center position in a flat, disk shape, a corrugated part obtained by forming the outside of the above center flat part in a corrugated shape so that the height of the corrugation projected towards a plane contacting the above high pressure-side or low pressure-side wetted surface is higher than the height of the corrugation projected towards the opposite surface, and an outer flat part obtained by flattening the section from the outside of the above corrugated part to the periphery.

(5) A differential pressure/pressure transmitter mentioned in (4), wherein the number of corrugations forming the above corrugated part is only one.

(6) A differential pressure/pressure transmitter mentioned in (4), wherein the number of corrugations forming the above corrugated part is two or more.

(7) A differential pressure/pressure transmitter provided with a high pressure-side diaphragm assembly comprising a high pressure-side process diaphragm, which transfers a high pressure from a process to the high pressure-side transfer oil, and a high pressure-side pre-loading diaphragm arranged so that its surface contacts the above high pressure-side transfer oil in addition to its back surface contacting closely the high pressure wetted surface having the low pressure-side overpressure liquid path;

a low pressure-side diaphragm assembly comprising a low pressure-side process diaphragm, which transfers a low pressure from the process to the low pressure-side transfer oil, and a low pressure-side pre-loading diaphragm arranged so that its surface contacts the above low pressure-side transfer oil in addition to its back surface contacting closely the low pressure wetted surface having the high pressure-side overpressure liquid path; and a differential pressure sensor assembly which detects the pressure difference between the above high pressure-side transfer oil from the above high pressure-side diaphragm assembly and the above low pressure-side transfer oil from the above low pressure-side diaphragm assembly;

the above high pressure-side pre-loading diaphragm and low pressure-side pre-loading diaphragm further respectively comprising:

a center flat part obtained by forming the center position in a flat, disk shape, a corrugated part obtained by forming the outside of the above center flat part in a corrugated shape so that the curvature of the radially outer crest portion of the corrugations projected towards a plane contacting the above high pressure-side or low pressure-side wetted surface is larger than the curvature of the radially inner crest portion of the above corrugations, and an outer flat part obtained by flattening the section from the outside of the above corrugated part to the periphery.

(8) A differential pressure/pressure transmitter mentioned in (7), wherein the number of corrugations forming the above corrugated part is only one.

(9) A differential pressure/pressure transmitter mentioned in (7), wherein the number of corrugations forming the above corrugated part is two or more.

(10) A differential pressure/pressure transmitter mentioned in (7), wherein the above described outer flat part is formed so that its radial dimension is larger by five times or more than the thickness of the pre-loading diaphragm.

DETAILED DESCRIPTION OF THE PREFERRED EMBODIMENTS

Embodiments of the present invention will be described below with reference to the drawings.

Figure 1:
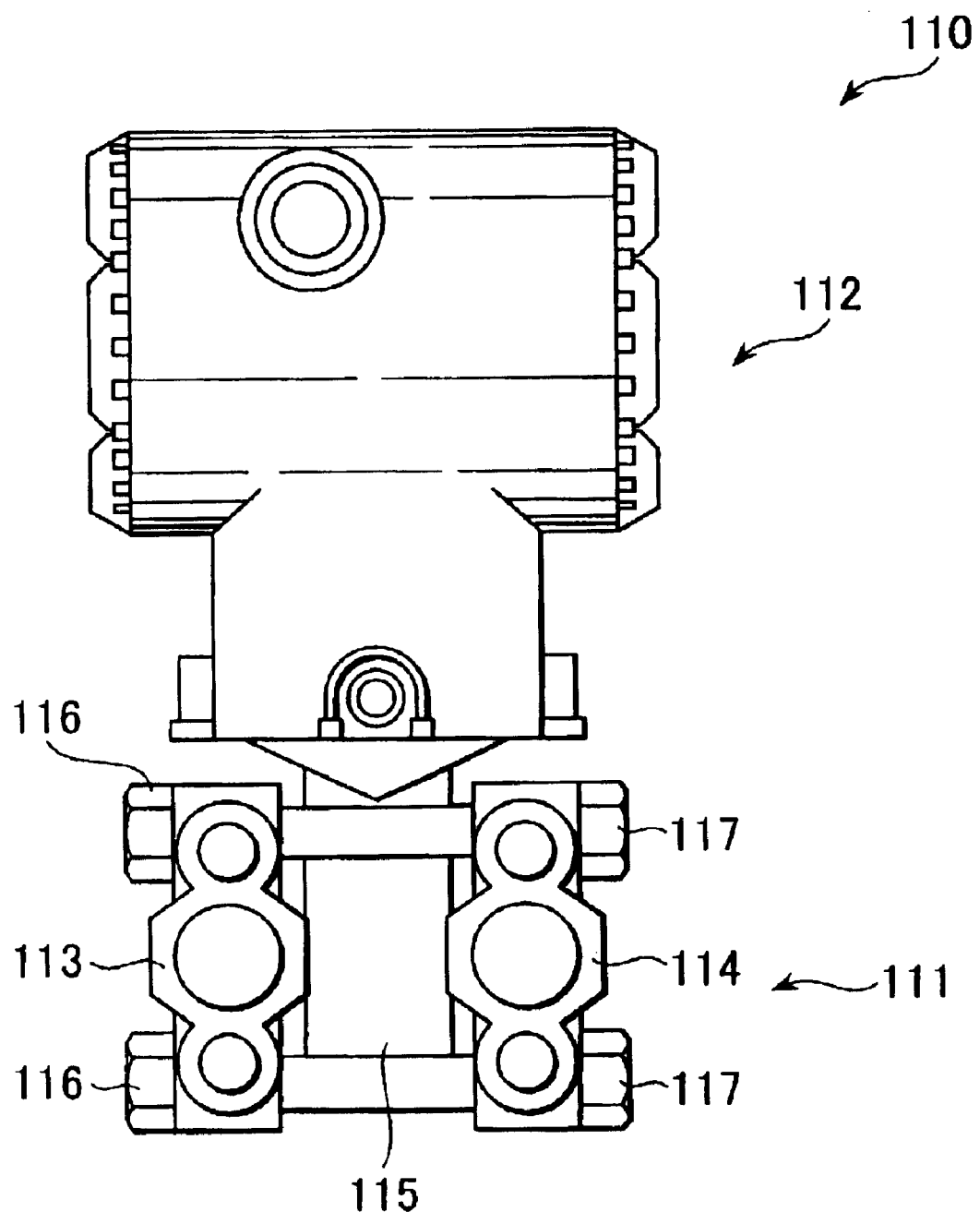
FIG. 1 is a plan of a differential pressure transmitter using conventional techniques.
Figure 2:
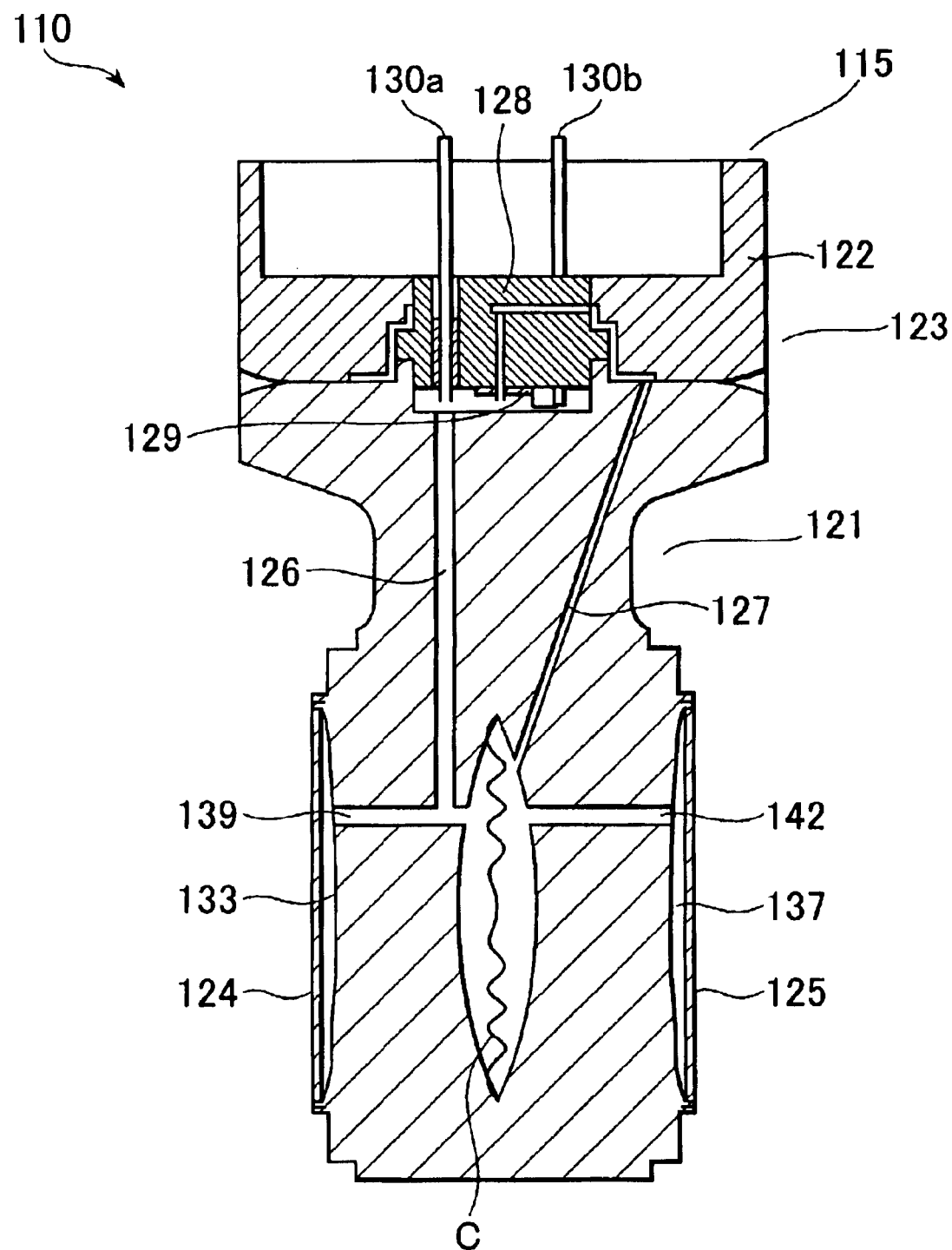
FIG. 2 is a cross-sectional view of the pressure sensing assembly using conventional techniques shown in FIG. 1.
Figure 3:
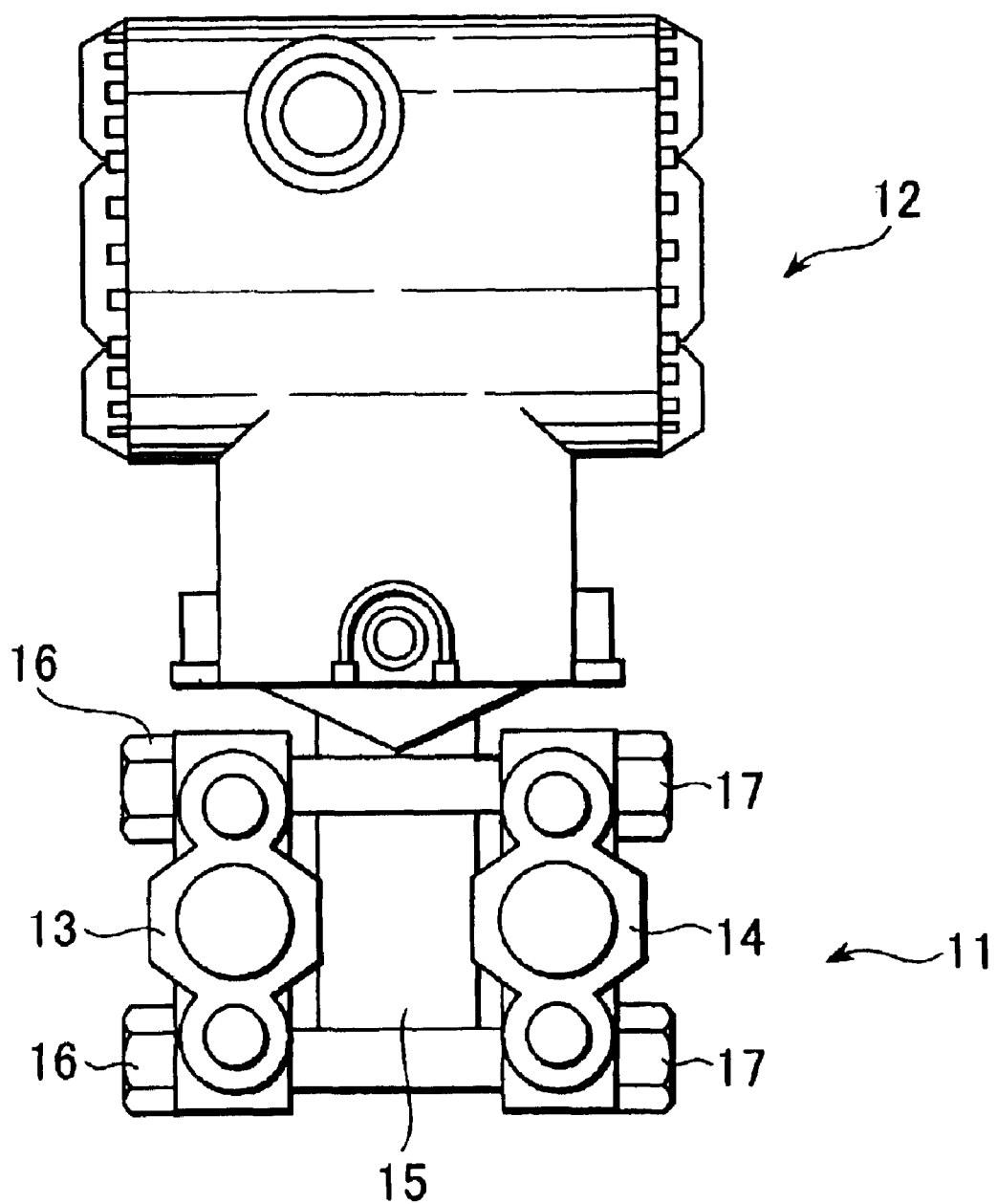
FIG. 3 is a plan of the differential pressure/pressure transmitter of the present invention.
Figure 4:
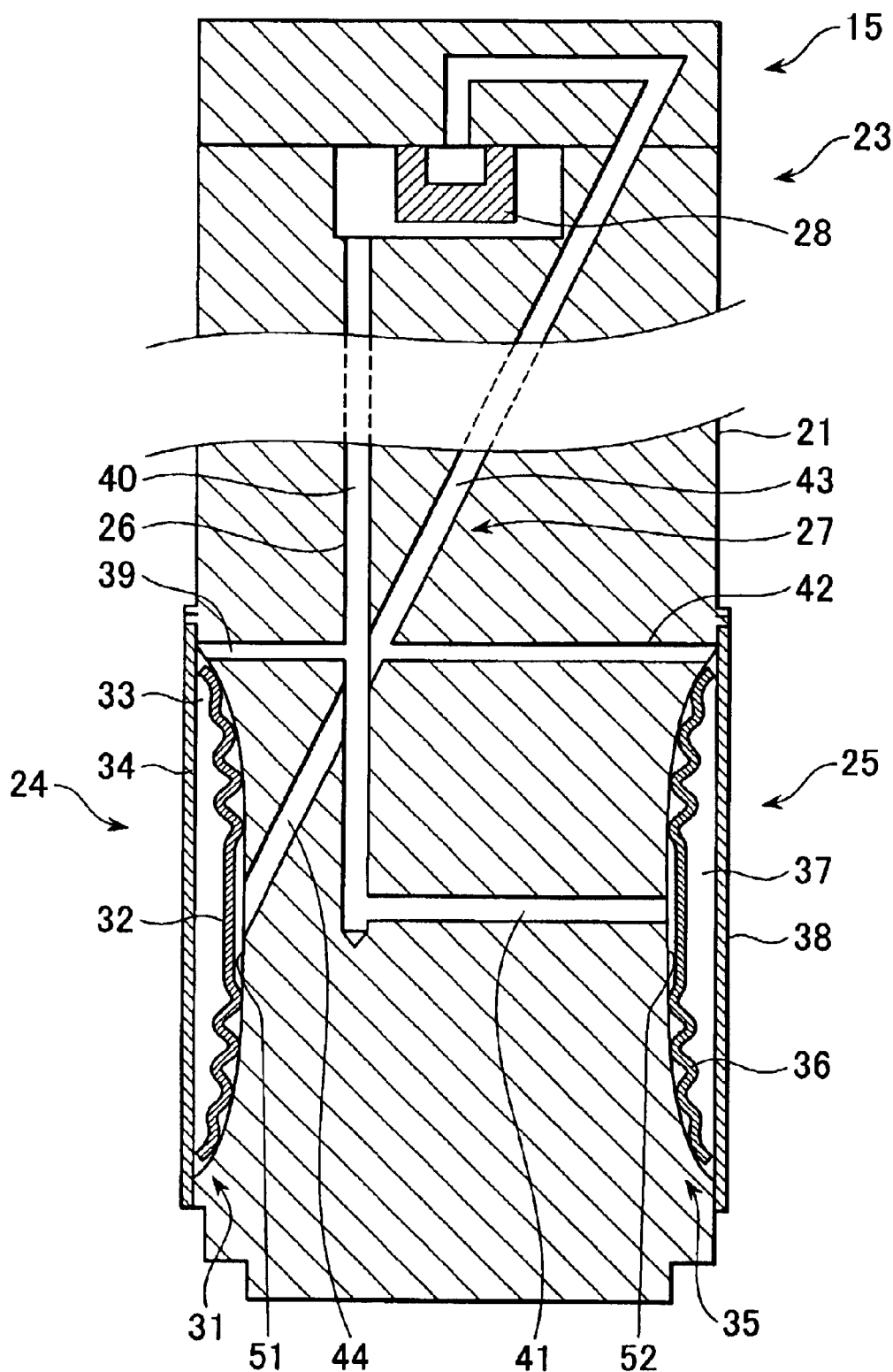
FIG. 4 is a cross-sectional view of the pressure sensing assembly of the transmitter shown in FIG. 3.

A differential pressure/pressure transmitter of the present invention has, as shown in FIG. 3 and FIG. 4, a construction that comprises pre-loading diaphragms which detect overpressures if applied to high pressure-side and low pressure-side diaphragm assemblies. The differential pressure/pressure transmitter is composed of pressure detection assembly 11, in which a pressure difference between high pressure and low pressure is converted to an electrical signal and of amplifier assembly 12 composed of electrical circuits for amplifying a signal generated in pressure detection assembly 11.

Pressure detection assembly 11 is composed of high pressure-side flange 13 forming the high pressure introduction part from which high pressures are introduced, low pressure-side flange 14 forming the low pressure introduction part from which low pressures are introduced, and pressure sensing assembly 15 which detects high and low pressures from high pressure-side flange 13 and low pressure-side flange 14 with diaphragms, and has a construction in which high pressure-side flange 13 and low pressure-side flange 14 are fixed by nuts 16 and bolts 17.

Pressure sensing assembly 15 is, as shown in FIG. 4, composed of body 21 and sensor assembly 23 fixed to the upper center position of body 21 with terminal 28.

Body 21 is composed of high pressure-side diaphragm assembly 24 and low pressure-side diaphragm assembly 25, arranged so that both diaphragm assemblies are facing outside and placed back to back to each other in the lower part of body 21, of high pressure-side oil transfer hole part 26 used for transferring oil from high pressure-side diaphragm assembly 24 to sensor assembly 23, and of low pressure-side oil transfer hole part 27 used for transferring oil from low pressure-side diaphragm assembly 25 to sensor assembly 23. Details of each assembly or part will be described below.

Sensor assembly 23 consists of terminal 28 and a differential pressure sensor mounted to terminal 28. This differential pressure sensor detects a differential pressure by applying high pressure-side pressure from the top and applying low pressure-side pressure from the bottom.

This differential pressure sensor has two hermetic terminals, each having electrical connections by wire bonding. The two hermetic terminals are connected to amplifier assembly 12 shown in FIG. 3.

High pressure-side diaphragm assembly 24 is composed of high pressure-side wetted part 31 having wetted surface 51 obtained by forming a side wall surface of body 21 in a concave curved surface; of high pressure-side pre-loading diaphragm 32 positioned such that it is in contact along the above concave curved surface; of high pressure-side planar process diaphragm 34 of a size that can cover high-pressure-side pre-loading diaphragm 32, having a predetermined space between itself and high pressure-side pre-loading diaphragm 32, arranged so that the entrance of high pressure-side conducting hole 39 for transferring high pressure-side oil 33 is provided outside the periphery of high pressure-side pre-loading diaphragm 32, and provided to face the outside so that high pressure-side concave curved surface wetted part 31 is shielded from the outside; and of high pressure-side oil 33 for transferring pressures, with which the space between high pressure-side pre-loading diaphragm 32 and high pressure-side process diaphragm 34 is filled.

Low pressure-side diaphragm assembly 25 is formed on the opposite side of high pressure-side diaphragm assembly 24, and is composed of low pressure-side wetted part 35 having wetted surface 52 obtained by forming a side wall surface of body 21 in a concave curved surface; of low pressure-side pre-loading diaphragm 36 positioned such that it is in contact along the above concave curved surface; of low pressure-side planar process diaphragm 38 of a size that can cover low pressure-side pre-loading diaphragm 36, having a predetermined space between itself and low pressure-side pre-loading diaphragm 36, arranged so that the entrance of low pressure-side conducting hole 42 for transferring low pressure-side oil 37 is provided outside the periphery of low pressure-side pre-loading diaphragm 36, and provided to face the outside so that low pressure-side concave curved surface wetted part 35 is shielded from the outside; and of low pressure-side oil 37 for transferring pressures, with which the space between low pressure-side pre-loading diaphragm 36 and low pressure-side process diaphragm 38 is filled.

High pressure-side oil transfer hole part 26 is composed of high pressure-side conducting hole 39 leading to high pressure-side wetted part 31 and opened in a position located outside the periphery of high pressure-side pre-loading diaphragm 32; high pressure-side sensor conducting hole 40 leading to high pressure-side conducting hole 39 and transferring high pressure side oil 33 to sensor assembly 23; and high pressure-side overpressure conducting hole 41 also leading to high pressure-side conducting hole 39 and arranged so that oil from this hole 41 pushes the approximate center position of low pressure-side pre-loading diaphragm 36 from the back.

Low pressure-side oil transfer hole part 27 is composed of low pressure-side conducting hole 42 leading to low pressure-side wetted part 35 and opened in a position located outside the periphery of low pressure-side pre-loading diaphragm 36; low pressure-side sensor conducting hole 43 leading to low pressure-side conducting hole 42 and transferring low pressure side oil 37 to sensor assembly 23; and low pressure-side overpressure conducting hole 44 also leading to low pressure-side conducting hole 42 and arranged so that oil from this hole 44 pushes the approximate center position of high pressure-side pre-loading diaphragm 32 from the back.

Figure 5:
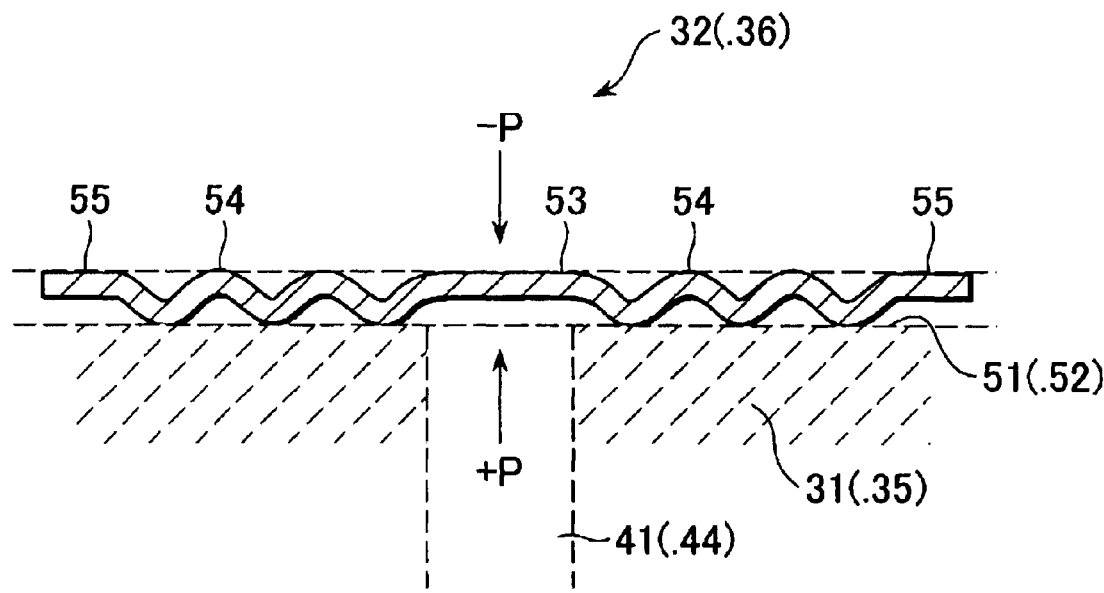
FIG. 5 is a cross sectional view of a pre-loading diaphragm indicating its construction in an embodiment of the present invention.

The construction of high pressure-side pre-loading diaphragm 32 and low pressure-side pre-loading diaphragm 36 are detailed in FIG. 5.

High pressure-side pre-loading diaphragm 32 and low pressure-side pre-loading diaphragm 36 have identical construction. Each of them is composed of center flat part 53 obtained by forming the center part in a flat, disk shape; corrugated part 54 in a wave shape formed so that the outside of center flat part 53 is projected as a corrugated crest on the side of contacting wetted surface 51 or 52 of high pressure-side wetted part 31 or low pressure-side wetted part 35 and the opposite side surface is level with the surface of center flat part 53; and outer flat part 55 obtained by flattening the section from the outside end of corrugated part 54 to the peripheral outside end of pre-loading diaphragm 32 or 36. In addition, although the number of corrugations in corrugated part 54 is two in the embodiment, this may be one or two or more.

In high pressure-side pre-loading diaphragm 32 or low pressure-side pre-loading diaphragm 36 having the above described construction, a large displacement volume (moved volume when changed from the initial state to the pressure-applied state) can be obtained at a low pressure compared with ordinary diaphragms, because the construction, which is such that the corrugation crests are projected at the surface on the side where the diaphragm contacts closely with wetted part 51 or 52 and are not projected at the opposite surface, extends the projected crest of corrugated part 54 and widens the surface area of the diaphragm itself against a positive side pressure (+P) applied from the high pressure-side or from low pressure-side overpressure conducting hole 41 or 44 and thus the area for pushing oil 33 or 37 is widened corresponding to the widening of the above diaphragm surface area.

On the other hand, regarding the negative side pressure (−P), although a larger displacement volume cannot be obtained compared with ordinary diaphragms, this is no problem because this is a region not used for pre-loading diaphragm 32 or 36.

Figure 8:
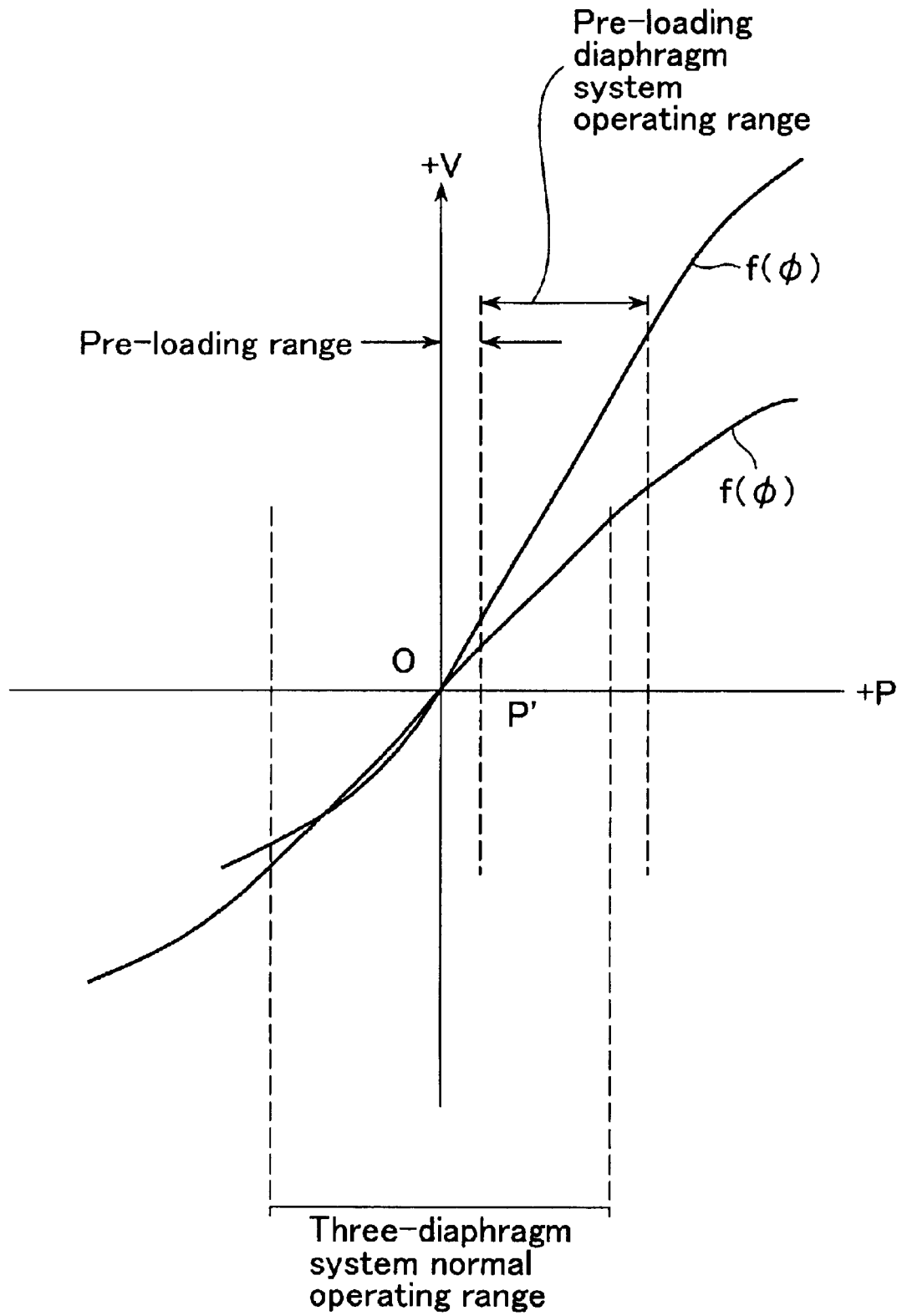
FIG. 8 is a graph of characteristic "f(φ)" showing the relationship between the pressure to the pre-loading diaphragm and the displacement volume.

If the relationship between pressure (P) and displacement volume (V) is expressed by "f($\phi$)" as shown in FIG. 8, in a system where pre-loading diaphragms 32 and 36 of the present invention are adopted, it can be easily understood that "f($\phi$)" increases displacement volume (+V) with a steep slope, compared with "f($\phi$)" curve in the graph for an ordinary three-diaphragm system using conventional techniques, due to extension of the crest part of corrugations in corrugated part 54 if pressure (+P) is applied.

Next, another embodiment for high pressure-side and low pressure-side pre-loading diaphragms 32 and 36 will be described with reference to a drawing.

Figure 6:
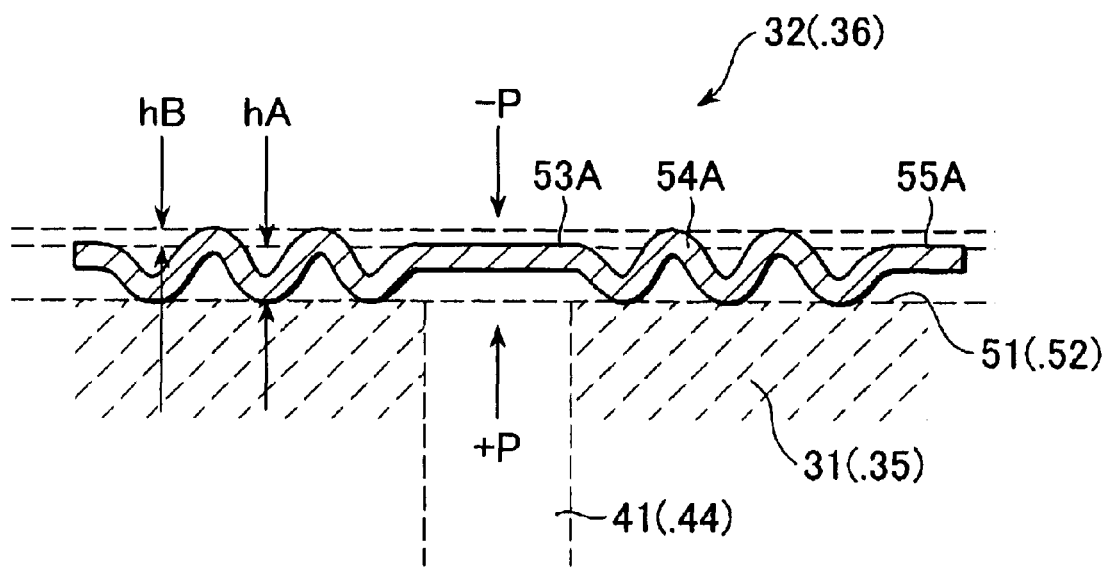
FIG. 6 is a cross-sectional view of a pre-loading diaphragm indicating its construction in another embodiment of the present invention.

An example of such high pressure-side or low pressure-side pre-loading diaphragms 32 or 36 is shown in FIG. 6.

In this embodiment, high pressure-side pre-loading diaphragm 32 or low pressure-side pre-loading diaphragm 36 is composed of center flat part 53A obtained by forming the center part in a flat disk shape; corrugated part 54A located outside center flat part 53A and obtained by forming corrugations so that the height hA of the corrugation crest projected toward the plane contacting wetted face 51 or 52 is higher than the height hB of corrugation crest projected towards the opposite side wetted face; and outer flat part 55A obtained by flattening the section from the outside of corrugated part 54A to the diaphragm outer end periphery. In addition, although the number of corrugations in corrugated part 54A is two in the embodiment, it may be one or two or more.

In high pressure-side pre-loading diaphragm 32 or low pressure-side pre-loading diaphragm 36, although diaphragm crests project toward both side faces, a large displacement volume (moved volume when changed from the initial state to the pressure-applied state) can be obtained at a lower pressure compared with ordinary diaphragms, because the construction, which is such that the height of the corrugation crest projection on the side of wetted part 51 or 52 is higher than the height of the corrugation crest projection on the opposite side, extends the projected crest of corrugated part 54 and widens the surface area of the diaphragm itself against a positive side pressure (+P) applied from high pressure-side or low pressure-side overpressure conducting hole 41 or 44.

On the other hand, regarding the negative side pressure (−P), although a larger displacement volume cannot be obtained compared with ordinary diaphragms, this is no problem because this is a region not used for pre-loading diaphragms.

Next, another further embodiment of high pressure-side and low pressure-side pre-loading diaphragms 32 and 36 will be described with reference to a drawing.

Figure 7:
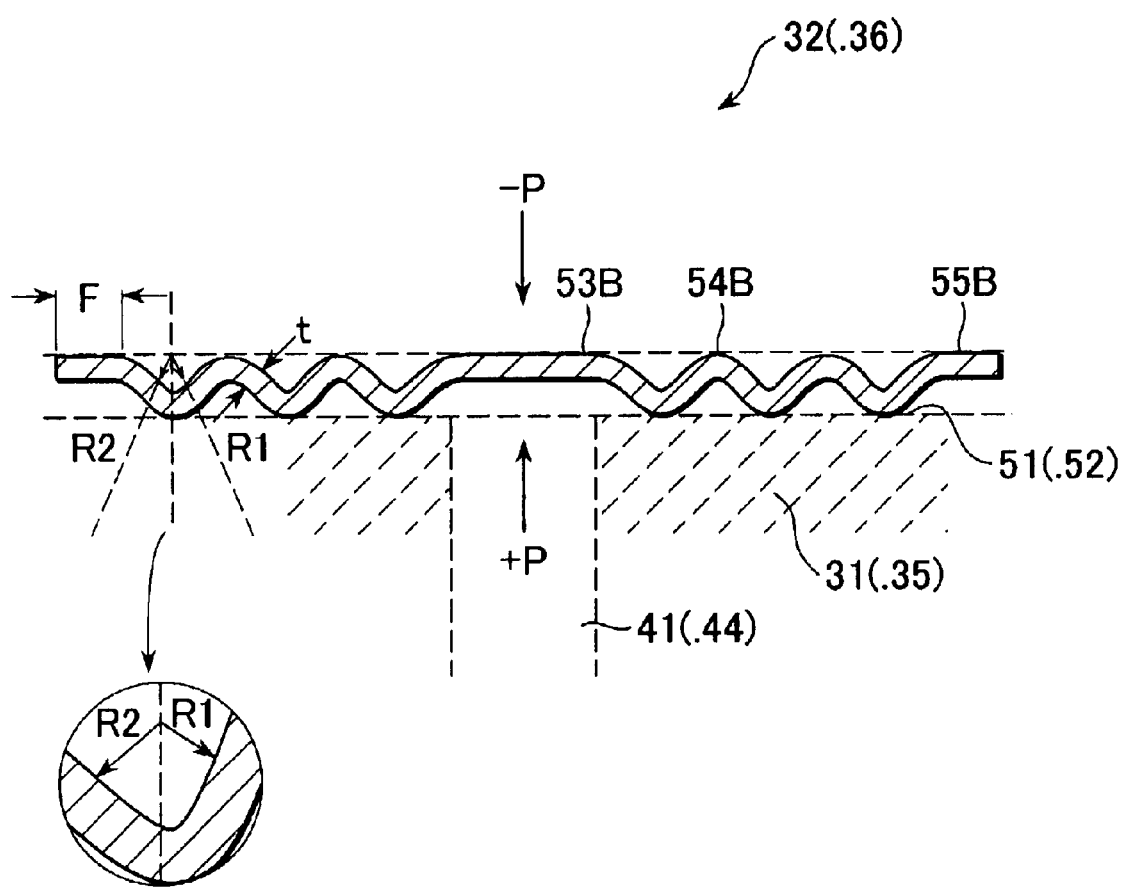
FIG. 7 is a cross-sectional view of a pre-loading diaphragm indicating its construction in a further embodiment of the present invention.

An example of such high pressure-side or low pressure-side pre-loading diaphragms 32 or 36 is shown in FIG. 7.

In this embodiment, high pressure-side pre-loading diaphragm 32 or low pressure-side pre-loading diaphragm 36 is composed of center flat part 53B obtained by forming the center part in a flat disk shape; corrugated part 54B located outside center flat part 53A and obtained by forming corrugations so that the curvature (radius) R2 of radially outer corrugation crest portion is larger than the curvature (radius) R1 of the radially inner corrugation crest portion of corrugations, projected toward the plane contacting the high pressure-side or low pressure-side wetted face 51 or 52; and outer flat part 55B obtained by flattening the section from the outside of corrugated part 54B to the diaphragm outer end periphery.

As seen above, forming the corrugations of corrugated part 54B, so that the radius R2 of radially outer corrugation crest portions is larger than the radius R1 of radially inner corrugation crest portions, gives better status of application for a positive pressure (+P) applied from high pressure side or low pressure-side overpressure conducting hole 41 or 44 to the surface of radially inner corrugation crest portions the radius of which is R1 and makes the status of extension of the corrugation crest portions smoother corresponding to the above change in pressure application status. This further improves the characteristic "f(φ)" of displacement volume shown in FIG. 8.

In addition, by designing the radial dimension F of outer flat part 55B to be five times or more the thickness "t" of pre-loading diaphragm 32 or 36, an applied pressure is received with the radially inner corrugation crest portion (radius R1) and that pressure is received with outer flat part 55B whose radial dimension is large. This enables a pre-loading diaphragm to be deformed and extended flexibly, and the slope of displacement volume characteristic curve "f(φ)" is further improved.

As described above, positive pressure (+P) is well received and the displacement volumes of high pressure-side and low pressure-side pre-loading diaphragms 32 and 36 can be increased even at low pressures, by forming these diaphragms in a corrugated shape as well as changing the corrugations in the direction of their height or changing the curvatures of their corrugation crests in the radial direction.

Accordingly, it becomes possible to design smaller pre-loading diaphragms at the design stage and thus more compact pressure sensing assemblies can be designed. In addition, the use of such pre-loading diaphragms eliminates the necessity of employing specific high-strength materials as diaphragm materials.

As apparent in the above description, the differential pressure/pressure transmitters of the present invention can give a large displacement volume even at a low pressure because their pre-loading diaphragms are formed in a corrugated shape. This enables the pre-loading diaphragms themselves to be designed smaller, it also eliminates the necessity for employing high-strength materials as diaphragm materials, and it has the effects of enabling simplification of the diaphragm manufacturing processes and realizing manufacturing cost reduction.

What is claimed is:

1. A differential pressure/pressure transmitter provided with
   a high pressure-side diaphragm assembly comprising a high pressure-side process diaphragm, which transfers a high pressure from a process to the high pressure-side transfer oil, and a high pressure-side pre-loading diaphragm arranged so that its surface contacts said high pressure-side transfer oil in addition to its back surface contacting closely the high pressure wetted surface having the low pressure-side overpressure liquid path;
   a low pressure-side diaphragm assembly comprising a low pressure-side process diaphragm, which transfers a low pressure from the process to the low pressure-side transfer oil, and a low pressure-side pre-loading diaphragm arranged so that its surface contacts said low pressure-side transfer oil in addition to its back surface contacting closely the low pressure wetted surface having the high pressure-side overpressure liquid path; and
   a differential pressure sensor assembly which detects the pressure difference between said high pressure-side transfer oil from said high pressure-side diaphragm assembly and said low pressure-side transfer oil from said low pressure-side diaphragm assembly;
said high pressure-side pre-loading diaphragm and low pressure-side pre-loading diaphragm further respectively comprising:
   a center flat part obtained by forming the center position in a flat, disk shape,
   a corrugated part obtained by forming the outside of said center flat part in a corrugated shape so that the outside part of said center flat part projects towards a plane contacting said high pressure-side or low pressure-side wetted surface, and
   an outer flat part obtained by flattening the section from the outside of said corrugated part to the periphery.

2. A differential pressure/pressure transmitter in accordance with claim 1, wherein the number of corrugations composing said corrugated part is only one.

3. A differential pressure/pressure transmitter in accordance with claim 1, wherein the number of corrugations composing said corrugated part is two or more.

4. A differential pressure/pressure transmitter provided with
   a high pressure-side diaphragm assembly comprising a high pressure-side process diaphragm, which transfers a high pressure from a process to the high pressure-side transfer oil, and a high pressure-side pre-loading diaphragm arranged so that its surface contacts said high pressure-side transfer oil in addition to its back surface contacting closely the high pressure wetted surface having the low pressure-side overpressure liquid path;
   a low pressure-side diaphragm assembly comprising a low pressure-side process diaphragm, which transfers a low pressure from the process to the low pressure-side transfer oil, and a low pressure-side pre-loading diaphragm arranged so that its surface contacts said low pressure-side transfer oil in addition to its back surface contacting closely the low pressure wetted surface having the high pressure-side overpressure liquid path; and
   a differential pressure sensor assembly which detects the pressure difference between said high pressure-side transfer oil from said high pressure-side diaphragm assembly and said low pressure-side transfer oil from said low pressure-side diaphragm assembly;
said high pressure-side pre-loading diaphragm and low pressure-side pre-loading diaphragm further respectively comprising:
   a center flat part obtained by forming the center position in a flat, disk shape, a corrugated part obtained by forming the outside of said center flat part in a corrugated shape so that the height of the corrugation projected towards a plane contacting said high pressure-side or low pressure-side wetted surface is higher than the height of the corrugation projected towards the opposite surface, and an outer flat part obtained by flattening the section from the outside of said corrugated part to the periphery.

5. A differential pressure/pressure transmitter in accordance with claim 4, wherein the number of corrugations composing said corrugated part is only one.

6. A differential pressure/pressure transmitter in accordance with claim 4, wherein the number of corrugations composing said corrugated part is two or more.

7. A differential pressure/pressure transmitter provided with a high pressure-side diaphragm assembly comprising a high pressure-side process diaphragm, which transfers a high pressure from a process to the high pressure-side transfer oil, and a high pressure-side pre-loading diaphragm arranged so that its surface contacts said high pressure-side transfer oil in addition to its back surface contacting closely the high pressure wetted surface having the low pressure-side overpressure liquid path;

a low pressure-side diaphragm assembly comprising a low pressure-side process diaphragm, which transfers a low pressure from the process to the low pressure-side transfer oil, and a low pressure-side pre-loading diaphragm arranged so that its surface contacts said low pressure-side transfer oil in addition to its back surface contacting closely the low pressure wetted surface having the high pressure-side overpressure liquid path; and a differential pressure sensor assembly which detects the pressure difference between said high pressure-side transfer oil from said high pressure-side diaphragm assembly and said low pressure-side transfer oil from said low pressure-side diaphragm assembly;

said high pressure-side pre-loading diaphragm and low pressure-side pre-loading diaphragm further respectively comprising:

a center flat part obtained by forming the center position in a flat, disk shape, a corrugated part obtained by forming the outside of the above center flat part in a corrugated shape so that the curvature of the radially outer crest portion of the corrugations projected towards a plane contacting said high pressure-side or low pressure-side wetted surface is larger than the curvature of the radially inner crest portion of said corrugations, and an outer flat part obtained by flattening the section from the outside of the above corrugated part to the periphery.

8. A differential pressure/pressure transmitter in accordance with claim 7, wherein the number of corrugations composing the above corrugated part is only one.

9. A differential pressure/pressure transmitter in accordance with claim 7, wherein the number of corrugations composing said corrugated part is two or more.

10. A differential pressure/pressure transmitter in accordance with claim 7, wherein said outer flat part is formed so that its radial dimension is larger by five times or more than the thickness of the pre-loading diaphragm.

* * * * *